United States Patent [19]
Moulton et al.

[11] Patent Number: 5,551,227
[45] Date of Patent: Sep. 3, 1996

[54] SYSTEM AND METHOD OF DETECTING PARTIAL FLAME OUT IN A GAS TURBINE ENGINE COMBUSTOR

[75] Inventors: John L. Moulton, West Chester; Peter T. Harrison, Mason, both of Ohio

[73] Assignee: General Electric Company, Cincinnati, Ohio

[21] Appl. No.: 362,045

[22] Filed: Dec. 22, 1994

[51] Int. Cl.$^6$ ...................................................... F02C 7/262
[52] U.S. Cl. ...................................... 60/39.06; 60/39.091
[58] Field of Search ............................ 60/39.06, 39.091, 60/39.141, 39.821, 223

[56] References Cited

U.S. PATENT DOCUMENTS

| | | | |
|---|---|---|---|
| 2,589,971 | 3/1952 | Skarstrom | 60/39.091 |
| 3,747,340 | 7/1973 | Fenton et al. | 60/39.281 |
| 3,765,176 | 10/1973 | Nelson et al. | 60/223 |
| 3,805,517 | 4/1974 | Sewell et al. | 60/39.09 |
| 3,830,055 | 8/1974 | Erlund | 60/39.09 R |
| 4,597,259 | 7/1986 | Moore et al. | 60/39.091 |
| 4,817,046 | 3/1989 | Rice et al. | 364/551.01 |
| 5,148,667 | 9/1992 | Morey | 60/39.02 |
| 5,168,699 | 12/1992 | McCarty et al. | 60/39.091 |
| 5,170,621 | 12/1992 | Barnum et al. | 60/39.091 |

*Primary Examiner*—Louis J. Casaregola
*Attorney, Agent, or Firm*—Andrew C. Hess; Nathan D. Herkamp

[57] ABSTRACT

A method of detecting partial flame out in a gas turbine engine combustor is provided which involves the steps of establishing a model for performance of the engine during a particular operating mode of the combustor, wherein the model assumes that all fuel supplied during the combustor operating mode is burned, calculating a value for an engine parameter in the model representative of engine performance, obtaining a sensed value for the engine parameter during operation of the engine at the combustor operating mode, and comparing the calculated value of the engine parameter and the sensed value of the engine parameter, wherein partial flame out of the combustor is detected when the sensed value of the engine parameter differs from the calculated value of the engine parameter by a predetermined amount. This method may be modified in order to take into account performance of the specific engine by establishing a reference value for the engine parameter based on the performance of the engine during the combustor operating mode at total fuel burn and comparing the difference of the sensed and calculated value of the engine parameter to the reference value of the engine parameter before determining whether the difference of the sensed and calculated values of the engine parameter differ by the predetermined amount. Alternatively, the predetermined amount may be modified according to any distinction between performance of the engine and the average performance of a gas turbine engine within the same engine line.

16 Claims, 4 Drawing Sheets

SYSTEM AND METHOD OF DETECTING PARTIAL FLAME OUT IN A GAS TURBINE ENGINE COMBUSTOR

BACKGROUND OF THE INVENTION

1. Field of the Invention

This invention relates generally to a combustor of a gas turbine engine and, more particularly, to a system and method of detecting partial flame out in a gas turbine engine combustor.

2. Description of Related Art

The combustor in a gas turbine engine is utilized to perform the function of burning a mixture of fuel and compressed air to produce gasses which drive one or more turbines located downstream thereof. It is well known that the amount of fuel burned by the combustor (i.e., the fuel-to-air ratio) has an effect on the production of such combustion gasses. Thus, as less fuel is burned, the temperature in the combustion chamber is lowered, less combustion gasses are produced, and the turbine output of the engine is decreased. When a combustor does not burn all of the fuel supplied to it, such as during a partial flame out, overall engine performance and efficiency suffers.

In the case of combustors designed specifically for low emissions, such as a triple annular combustor of the General Electric Company known by the designation LM6000 Dry Low Emissions (DLE), partial blow out of the flame therein has an even greater impact. As noted above, partial flame out is one cause for a drop in the temperature in the combustion chamber. Because the LM6000 DLE gas turbine engine is designed to maintain delivered power, the engine control will cause additional fuel to be added to the combustor. However, adding fuel to a combustor which does not burn it all has the adverse consequence of producing a high level of emissions and unburned hydrocarbons which is contrary to the goals of a low emissions combustor. Moreover, the excess fuel supplied to the combustor is wasted.

It should be noted that flame out of the entire combustor has a drastic effect which is easily recognized since the engine will be unable to continue operation. However, partial flame out of the combustor is more difficult to detect since the consequences thereof may only be slight with regard to the overall engine operation. This is because flame out may occur in only a few localized combustion regions. The causes of such localized or partial flame out are varied (e.g., combustor geometry, localized cooling/bleed flows, etc.), but the end result is that the fuel/air ratio is not conducive to being ignited. It has been found that partial flame out of the LM6000 DLE combustor typically occurs during the transition between combustor operating modes, such as when an annular combustor located radially inward or outward of the pilot dome is being activated. While the activation of these other domes is dependent upon the pilot dome for ignition, it can occur only in the combustion regions where the carburetor devices are able to provide the necessary fuel/air ratio.

Given the adverse effects of combustor flame out, various systems have been developed to detect this condition. One such system is a flame detection measurement system that utilizes sensors to detect the presence or absence of flame at predetermined locations. It has been found that this type of flame detection system is highly dependent upon the location and reliability of the sensor. Because such sensors are a mechanical device prone to wear, failure, and environmental conditions, they have not provided the high degree of reliability required. Moreover, the placement of sensors within the combustor has oftentimes made it difficult to detect localized flame out in the combustor. In addition, flame detection measurement systems are generally expensive to supply and maintain for production.

A second type of flame detection system is one which measures exhaust gas. In this type of system, a sample of the exhaust gas emitted out of the combustor is sampled and analyzed to determine its composition. It has been found that this type of system has a high degree of reliability, but it is considered to be slow and expensive, as well as require add-on hardware. Another consideration involved with exhaust gas measurement systems is the need for close monitoring of the system, which is undesirable in many applications that preferably are operated automatically at remote locations.

Accordingly, it would be desirable for a flame detection system to be developed for gas turbine engine combustors which is reliable, relatively inexpensive, requires no additional hardware, operates in near "real time," has a high degree of sensitivity, and can be controlled automatically from a remote location.

SUMMARY OF THE INVENTION

A method of detecting partial flame out in a gas turbine engine combustor is provided which involves the steps of establishing a model for performance of the engine during a particular operating mode of the combustor, wherein the model assumes that all fuel supplied during the combustor operating mode is burned, calculating a value for an engine parameter in the model representative of engine performance, obtaining a sensed value for the engine parameter during operation of the engine at the combustor operating mode, and comparing the calculated value of the engine parameter and the sensed value of the engine parameter, wherein partial flame out of the combustor is detected when the sensed value of the engine parameter differs from the calculated value of the engine parameter by a predetermined amount. This method may be modified in order to take into account performance of the specific engine by establishing a reference value for the engine parameter based on the performance of the engine during the combustor operating mode at total fuel burn and comparing the difference of the sensed and calculated values of the engine parameter to the reference value of the engine parameter before determining whether the difference of the sensed and calculated values of the engine parameter differ by the predetermined amount. Alternatively, the predetermined amount may be modified according to any distinction between performance of the engine and the average performance of a gas turbine engine within the same engine line.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
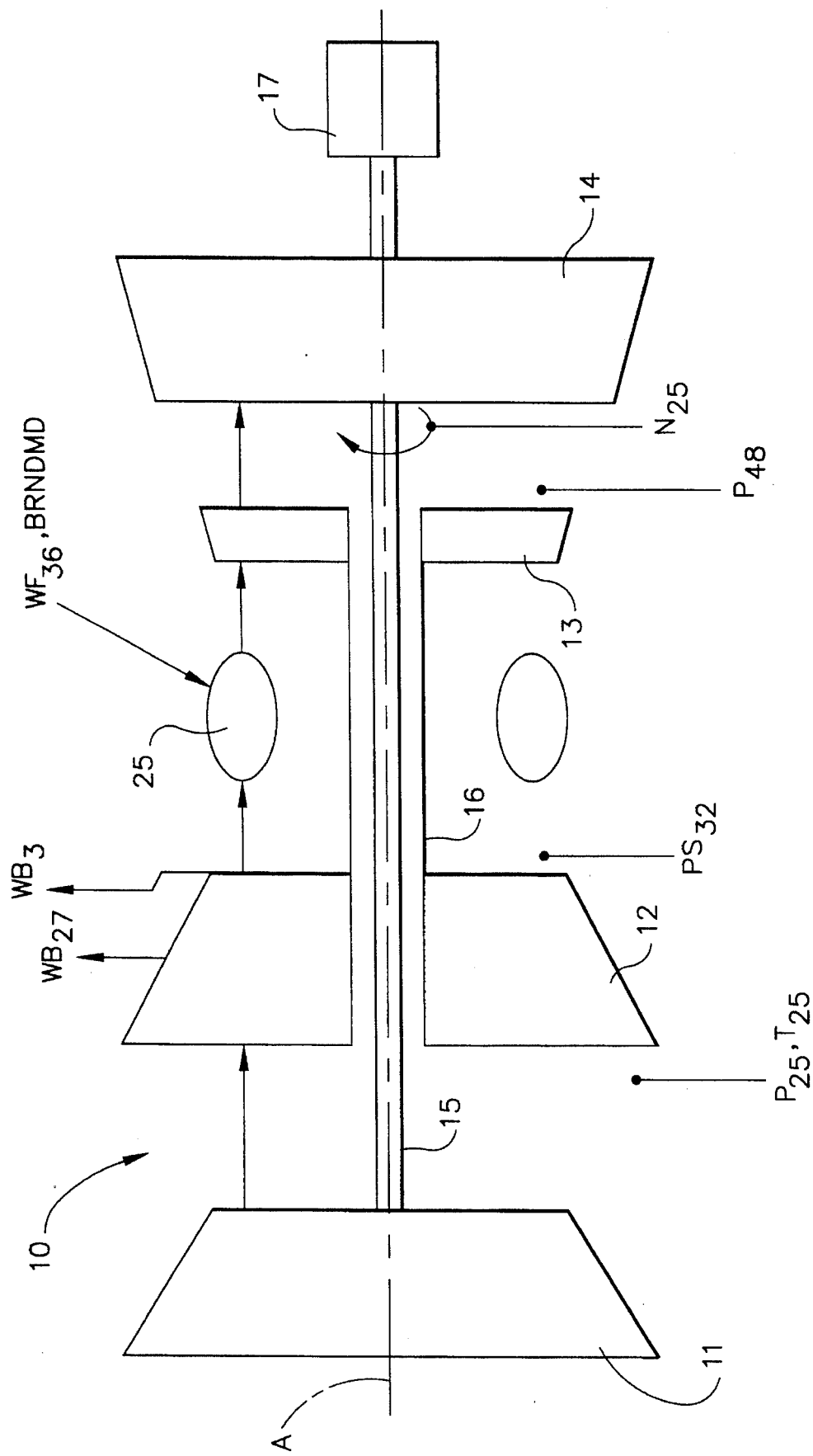
FIG. 1 is a schematic, cross-sectional view of a gas turbine engine depicting locations of certain engine parameters utilized by the flame out detection system of the present invention.

Referring now to the drawings in detail, wherein identical numerals indicate the same elements throughout the figures, FIG. 1 depicts an aeroderivative gas turbine engine 10 of the type having a low pressure compressor 11, a high pressure compressor 12 downstream of low pressure compressor 11, a combustor 25 downstream of high pressure compressor 12, a high pressure turbine 13 downstream of combustor 25, and a low pressure turbine 14 downstream of high pressure turbine 13. The standard configuration for engines of this type is a dual concentric shafting arrangement, whereby low pressure turbine 14 is drivingly connected to low pressure compressor 11 by a shaft 15 and high pressure turbine 13 is similarly drivingly connected to high pressure compressor 12 by a second shaft 16 external and concentric to shaft 15. In the gas turbine depicted in FIG. 1, low pressure turbine 14 is connected directly to low pressure compressor 11 and a load 17. An example of such an engine is manufactured by General Electric Company of Evendale, Ohio under the designation LM6000 DLE.

Figure 2:
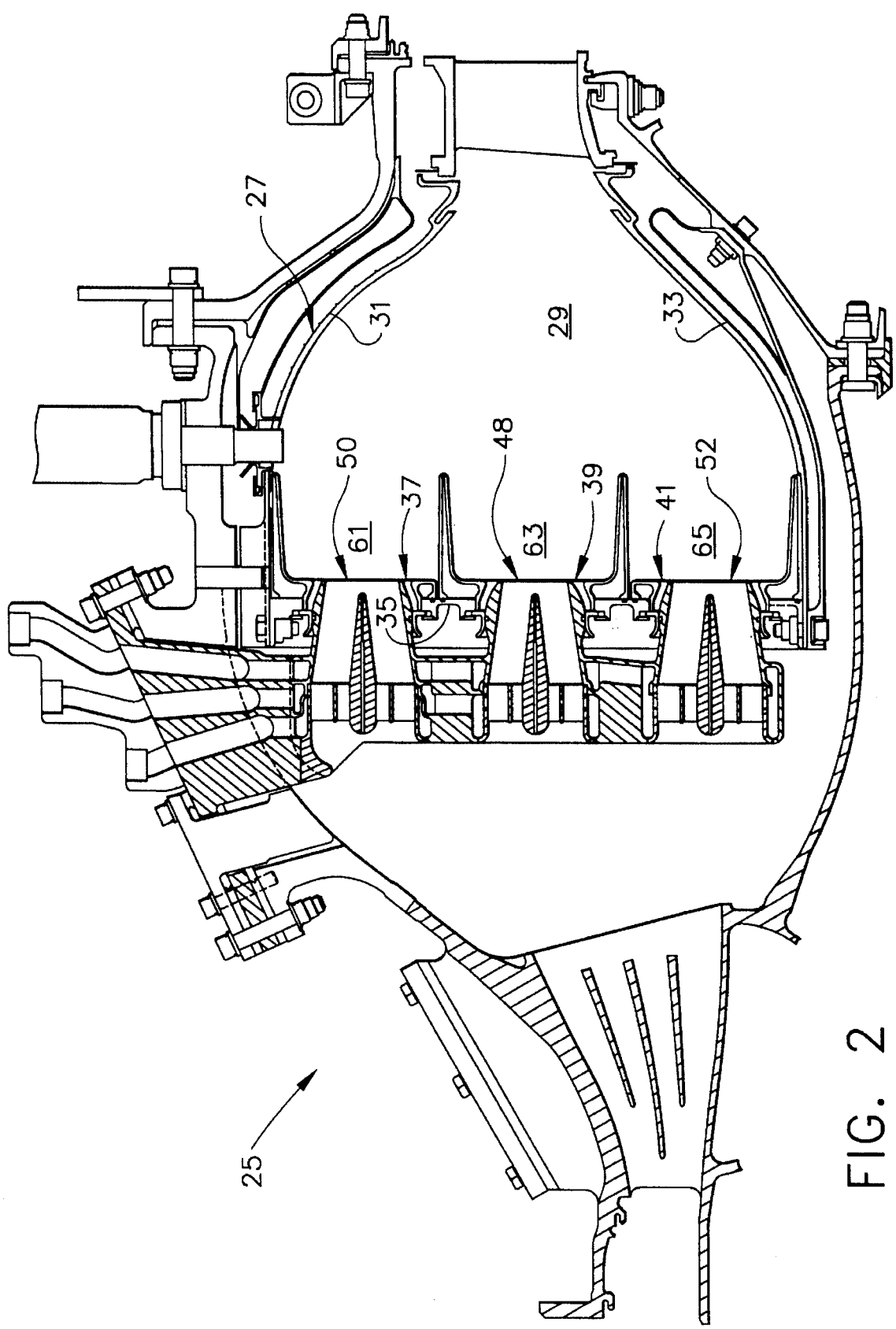
FIG. 2 is a cross-sectional view through the triple annular combustor structure of FIG. 1.

FIG. 2 depicts combustor 25 which comprises a hollow body 27 defining a combustion chamber 29 therein. Hollow body 27 is generally annular in form and is comprised of an outer liner 31, an inner liner 33, and a domed end or dome plate 35. In the present annular configuration, domed end 35 of hollow body 27 includes three separate radial domes—outer dome 37, middle dome 39, and inner dome 41. It will be understood that combustor 25 is described in more detail in U.S. Pat. No. 5,323,604, which is hereby incorporated by reference.

Each of domes 37, 39 and 41 include therein a plurality of openings for receiving means for mixing air and fuel prior to entry into combustion chamber 29. Since combustor 25 is predicated on an extremely well mixed flame in order to minimize emissions produced during combustion, it is preferred that the fuel/air mixing means preferably be a mixer in accordance with that disclosed in U.S. Pat. No. 5,251,447, which is also hereby incorporated by reference.

It will be understood that combustor 25 is designed to minimize emissions produced during combustion. In this regard, combustor 25 incorporates a dome and fuel technique which utilizes a lean premix concept during all stages of combustor operation to maintain each combustion zone within a specified temperature range, preferably 2500°–3000° F. Because combustor 25 operates at "lean premix," whereby the fuel/air mixture contains more air than is required to fully combust the fuel, it has been found that combustor 25 is more susceptible to the possibility of flame blow out. While total flame blow out of combustor 25 is easily detected since engine 10 will discontinue operation, it has been found that partial flame blow out, which may be relegated to certain localized combustion regions, is rather difficult to detect under existing systems.

As explained in further detail in U.S. Pat. No. 5,303,542, which is hereby incorporated by reference, combustor 25 operates at various modes depending upon desired engine output level. In order to maintain a lean mixture of fuel and air slightly above lean blow out to sustain low emission levels, the mixers of the various domes are preferably staged (either circumferentially, radially, or a combination of the two) so that only certain mixers are supplied fuel to produce a flame in combustion zones 61, 63 and 65 at any given time. Although the triple annular configuration of combustor 12 affords the opportunity to have any number of combinations for supplying fuel to mixers 48, 50 and 52, the typical stage progression involves: (1) supply fuel to fuel/air mixers 48 and ignite middle dome 39, also known as the pilot dome; (2) supply fuel to fuel/air mixers 52 and ignite inner dome 41 in addition to pilot dome 39; (3) discontinue supply of fuel to mixers 52 of inner dome 41, supply fuel to mixers 50, and ignite outer dome 37 in addition to pilot dome 39; and (4) supply fuel to mixers 52 and ignite inner dome 41 in addition to outer and pilot domes 37 and 39, respectively. It will be understood that the ignition of flame within combustion zones 61 and 65, respectively, is accomplished by the flame within combustion zone 63 when the appropriate fuel-to-air ratio exists. It has been found, however, that the transition of combustor 25 between the aforementioned stages further creates a potential for partial flame blow out.

In order to better detect partial flame out of combustor 25, a system 85 of the present invention, utilizing an algorithm denoted generally by the numeral 100, establishes a model for performance of engine 10 during the various operating modes of combustor 25. As will be described in greater detail herein, algorithm 100 runs to standard control sensed parameters of engine 10 known as boundary conditions, assumes all of the fuel flow into combustor 25 is burned, and integrates a rotor speed independent that of engine 10. When combustor 25 of engine 10 is partially flamed out, some of the fuel flow therethrough is not burned which causes actual engine performance to differ relative to the engine performance calculated by algorithm 100.

After establishing the performance model for engine 10, it is preferred that an engine parameter 102 representative of engine performance be identified which can be calculated by algorithm 100. Engine parameter 102 preferably is one that is directly sensed within engine 10 so that both a calculated value and a sensed value may be obtained and compared. When the difference between the calculated value of engine parameter 102 and the sensed value of engine parameter 102 differ by a predetermined amount or limit, then combustor 25 is considered partially flamed out and control 75 takes the appropriate action to relight combustor 25. When combustor 25 of engine 10 is not partially flamed out, then the calculated value of engine parameter 102 will match the sensed value of engine parameter 102 within the predetermined amount. The predetermined amount utilized preferably is large enough to accommodate engine to engine variation and a certain amount of engine deterioration, and preferably will be approximately 10–15% of the calculated value of engine parameter 102.

It will be understood that system 85 utilizes a model based control approach to determine partial flame out for gas turbine engine 10. Accordingly, this technique adds minimal cost to the engine since it involves only the implementation of algorithm 100 in the control software. In addition, it has been found that this approach is very sensitive to partial flame out and is able to indicate the same almost in real time since engine parameter 102 responds almost instantaneously to a flame out. Further, because no sensors or other mechanical devices are included as part of this system in addition to those already used to monitor certain engine parameters and conditions, the reliability of system 85 is of a high quality and has the flexibility to be utilized in any engine. It should also be specifically noted that the system and method of the present invention can be utilized in conjunction with the combustor of any gas turbine engine and is not limited to the triple annular combustor 25 depicted and discussed herein.

Figure 3:
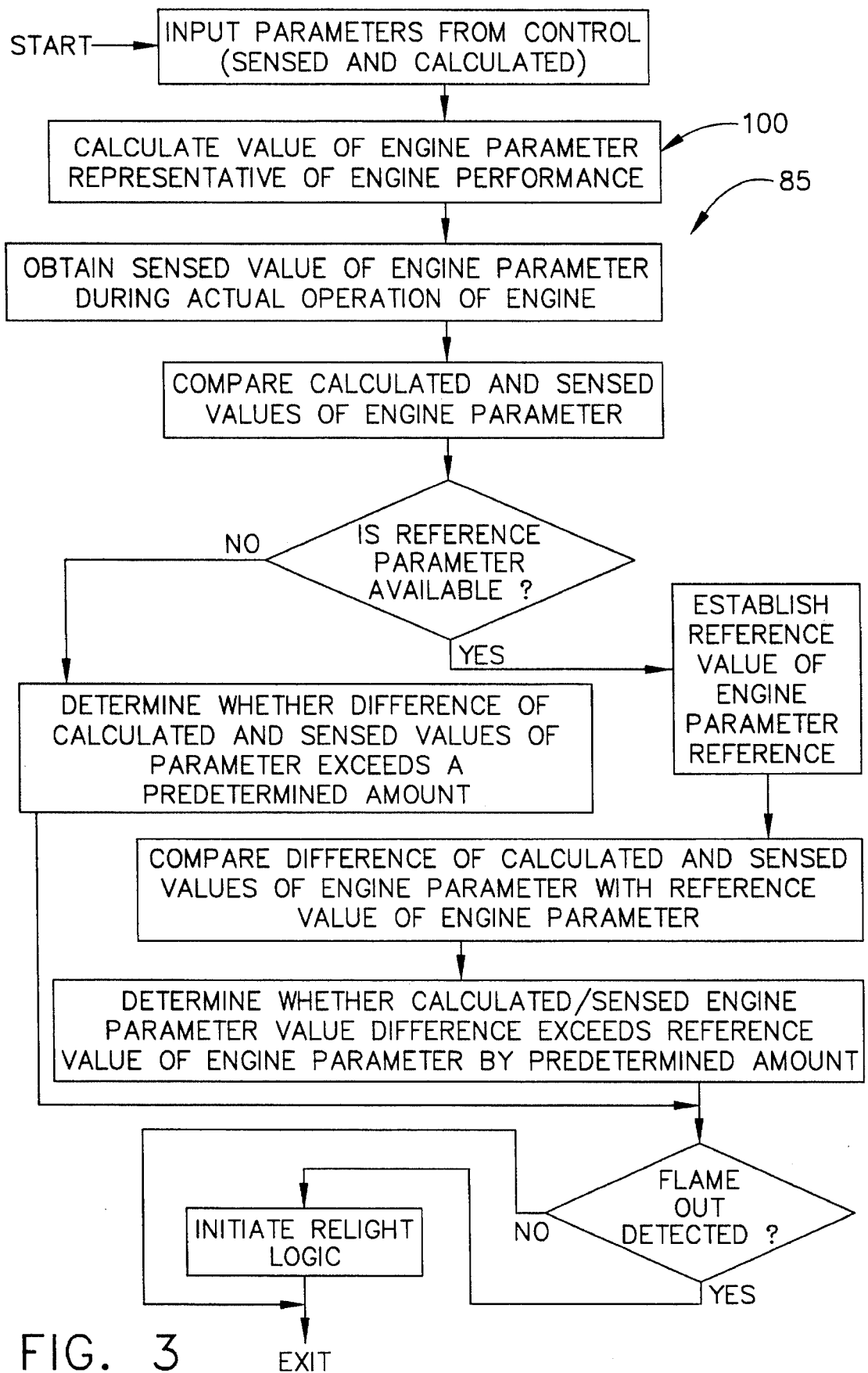
FIG. 3 is a flow chart depicting the logic of the flame out detection system of the present invention.

More specifically, as seen in the flow diagram of FIG. 3, system 85 is a closed loop system in which certain input parameters, including the initial setting of inlet conditions for high pressure compressor 12, are provided to algorithm 100 from engine control 75. Thereafter, algorithm 100 (which is based upon an average engine performance of a gas turbine engine within a specific engine line) calculates a value of engine parameter 102 representative of engine performance. This is accomplished by solving a plurality of equations related to the performance of the high pressure compressor, the combustor and the high pressure turbine, as performed by certain modules described in more detail hereinafter. It will be noted that the calculated value of engine parameter 102 is based upon a single pass through algorithm 100 for a given set of input conditions and certain variables updated based on predetermined cycle error terms. Accordingly, when the input conditions (engine cycle) reach a steady state, the cycle error will be zero and algorithm 100 will be balanced at that particular cycle condition. A sensed value of engine parameter 102 is then obtained during actual engine operation and compared to the calculated value of engine parameter 102 in engine control 75. If the difference between the sensed and calculated values of engine parameter 102 differs by a predetermined amount, partial flame out is deemed detected and engine control 75 initiates the relighting process. Otherwise, no flame out is detected and engine parameter 102 is continuously recalculated and compared to updates of the sensed values for engine parameter 102.

In order to better determine if a partial flame out has occurred in engine 10, a reference value for engine parameter 102 may be established for performance of engine 10 instead of relying upon an average performance of which algorithm 100 is representative. This is accomplished by performing tests on engine 10 to determine engine performance during each combustor operating mode at total fuel burn. The reference value of engine parameter 102 can then be calculated to match the value of engine parameter 102 calculated by algorithm 100 to the same parameter sensed by engine 10 at total fuel burn.

It will be understood that engine parameter 102 may be any parameter which is representative of engine performance and may be different for various engines. One factor involved is the available boundary conditions input into algorithm 100, which in turn is dependent upon the existing sensors positioned within the given engine. With respect to the triple annular combustor 25 disclosed herein, it is preferred that engine parameter 102 be the static pressure $PS_{32}$ at the inlet of combustor 25. Although other engine parameters may be utilized, such as the rotor speed $N_{25}$ of high pressure shaft 16, it has been found that the combustor inlet static pressure $PS_{32}$ is the least susceptible to change between each LM6000 DLE engine. Whichever engine parameter is utilized to represent engine performance, however, it is imperative that algorithm 100 be allowed to calculate a rotor speed independent of the actual rotor speed of the engine.

With respect to the LM6000 DLE engine, the boundary conditions sensed in engine 10 and utilized in algorithm 100 include the inlet pressure $P_{25}$ of high pressure compressor 12, the inlet temperature $T_{25}$ of high compressor 12, and the exit pressure $P_{48}$ of high pressure turbine 13. Each of these boundary conditions are marked within FIG. 1. Further, other inputs to algorithm 100 are calculated within engine control 75 and include mid compressor customer bleed $WBC_{27}$ of high pressure compressor 12, discharge customer bleed $WBC_3$ of high pressure compressor 12, the fuel heating value FHV, fuel flow $W_f$ to combustor 25, and the time step at between passes of algorithm 100.

Figure 4:
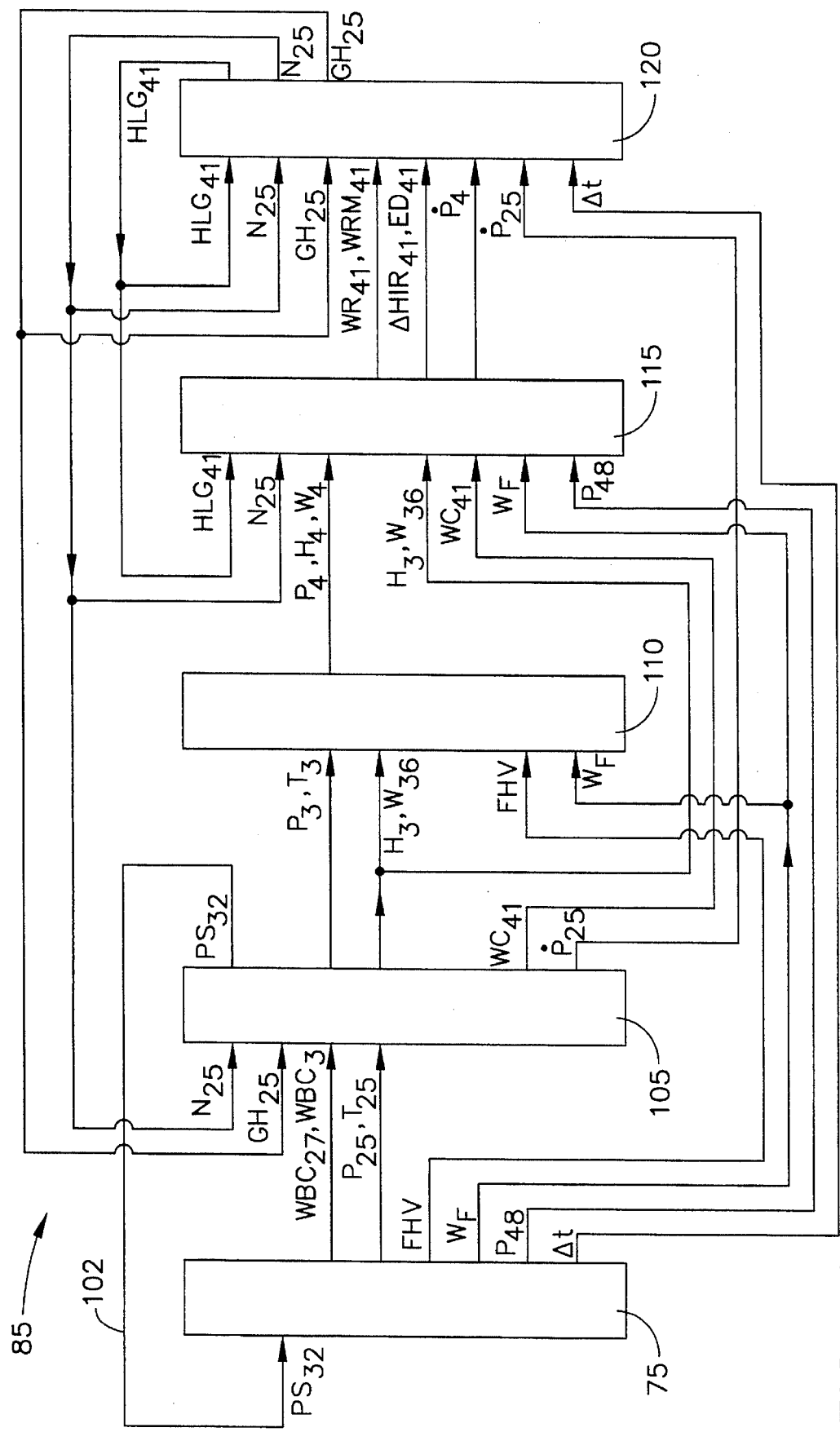
FIG. 4 is a schematic block diagram of the algorithm utilized by the flame out detection system depicted in FIG. 3.

As best seen in FIG. 4, the inlet pressure $P_{25}$ of high pressure compressor 12 and the inlet temperature $T_{25}$ of high pressure compressor 12 are input to a high pressure compressor module 105 from engine control 75. In addition, the customer bleed flows $WBC_{27}$ and $WBC_3$ calculated within control 75 are input to high pressure compressor module 105. The operating line parameter $GH_{25}$ of high pressure compressor 12 and the rotor speed $N_{25}$ of high pressure shaft 16 are also initialized and input into high pressure compressor module 105. The performance of high pressure compressor 12, represented by compressor power $PW_{25}$, is calculated by the following equation:

$$PW_{25}=W_{25}(H_3-H_{25})-WB_{26}(H_3-HB_{26})- WBC_{27}(H_3-HB_{27})- WB_{28}(H_3-HB_{28})$$

The first term of the equation, the product of the inlet mass flow rate $W_{25}$ of high pressure compressor 12 and the difference between the high pressure compressor exit enthalpy $H_3$ and the compressor inlet enthalpy $H_{25}$, is the power required to drive high pressure compressor 12 with no bleed flow extraction. The other three terms represent the reduction in the power required to drive high pressure compressor 12 since the bleed flow does not go all the way therethrough. The power reduction due to the low pressure bleed is represented by the product of the low pressure bleed flow $WB_{26}$ and the difference between the compressor exit enthalpy $H_3$ and the low pressure bleed enthalpy $HB_{26}$. The power reduction due to the mid pressure customer bleed is represented by the product of the mid pressure customer bleed flow $WBC_{27}$ and the difference between the compressor exit enthalpy $H_3$ and the mid pressure customer bleed enthalpy $HB_{27}$. The power reduction due to the mid pressure bleed is represented by the product of the mid pressure bleed flow $WB_{28}$ and the difference between the compressor exit enthalpy $H_3$ and the mid pressure bleed enthalpy $HB_{28}$.

In order to calculate compressor power in the above formula, the following equations must also be solved within high pressure compressor module 105:

$$W_{25} = (WR_{25} \times P_{25}/14.696)/\sqrt{\theta_{25}}$$

$$WR_{25} = f(\%N_{25}, GH_{25})$$

$$\theta_{25} = T_{25}/518.67$$

where $W_{25}$=inlet mass flow rate of high pressure compressor 12

$WR_{25}$=high pressure compressor inlet corrected mass flow rate $\theta_{25}$=temperature correction factor $P_{25}$=sensed inlet pressure of high pressure compressor 12

$\% N_{25}$=percent corrected speed $GH_{25}$=high pressure compressor operating line parameter $T_{25}$=sensed inlet temperature of high pressure compressor 12

It will be understood that the inlet corrected mass flow rate $WR_{25}$ of high pressure compressor 12 is a function of the percent corrected speed $\% N_{25}$ and the operating line parameter $GH_{25}$ of high pressure compressor 12, which is determined from a map of high pressure compressor 12. Also, it is seen that the temperature correction factor $\theta_{25}$ is equivalent to the sensed inlet temperature $T_{25}$ of high pressure compressor 12 divided by 518.67, so that the inlet mass flow rate $W_{25}$ of high pressure compressor 12 is calculated from the sensed inlet pressure $P_{25}$ and the sensed inlet temperature $T_{25}$ of high pressure compressor 12.

Next, it will be understood that the exit enthalpy $H_3$ of high pressure compressor 12 is calculated by the following:

$$H_3 = H_{25} + \Delta HR_{25} \times \theta_{25}$$

$$H_{25} = f(T_{25})$$

$$\Delta HR_{25} = f(\% N_{25}, GH_{25})$$

where $H_3$=exit enthalpy of high pressure compressor 12.
$H_{25}$=inlet enthalpy of high pressure compressor 12
$\Delta HR_{25}$=corrected work of high pressure compressor 12

The exit enthalpy $H_3$ of high pressure compressor 12 is equivalent to the sum of the inlet enthalpy $H_{25}$ and the product of the corrected work $\Delta HR_{25}$ of high pressure compressor 12 and the temperature correction factor $\theta_{25}$. It is seen that inlet enthalpy $H_{25}$ is equivalent to a function of the sensed inlet temperature $T_{25}$ of high pressure compressor 12 and the corrected work $\Delta HR_{25}$ is equivalent to a function of the percent corrected speed % $N_{25}$ and the high pressure compressor operating line parameter $GH_{25}$. Each of these parameters are determined from maps for high pressure compressor 12. As seen above, the temperature correction factor $\theta_{25}$ is equivalent to the inlet sensed temperature $T_{25}$ of high pressure compressor 12 divided by 518.67.

The low pressure bleed mass flow rate $WB_{26}$ is calculated from the following equations:

$$WB_{26} = W_{25} \times f(WR_{25}) \text{ and } WR_{25} = f(\% N_{25}, GH_{25})$$

where $WB_{26}$=low pressure bleed mass flowrate of high pressure compressor 12
$WR_{25}$=inlet corrected mass flow rate of high pressure compressor 12

The low pressure bleed enthalpy $HB_{26}$ is calculated from the following equations:

$$HB_{26} = H_3 \times f(\%N_3)$$

$$\%N_3 = (0.01018) \times N_{25} \times \sqrt{518.67/T_3}$$

$$T_3 = f(H_3)$$

where $HB_{26}$=low pressure bleed enthalpy of high pressure compressor 12
% $N_3$=percent corrected speed
$N_{25}$=rotor speed
$T_3$=exit temperature of high pressure compressor 12

As seen therefrom, the low pressure bleed enthalpy $HB_{26}$ is equivalent to the exit enthalpy $H_3$ of high pressure compressor 12 multiplied by a function of the percent corrected speed % $N_3$. The percent corrected speed % $N_3$ is then equivalent to the rotor speed $N_{25}$ multiplied by a correction factor (0.01018) and the square root of 518.67 divided by the exit temperature $T_3$ of high pressure compressor 12. It should be noted that the exit temperature $T_3$ is considered to be a function of the exit enthalpy $H_3$, as calculated above, and the mid pressure customer bleed $WBC_{27}$ as previously calculated by engine control 75.

The mid pressure bleed enthalpy $HB_{27}$, like the low pressure bleed enthalpy $HB_{26}$, is also calculated as the product of the exit enghalpy $H_3$ and a function of percent corrected speed f(% $N_3$). Likewise, the mid pressure bleed mass flow rate $WB_{28}$ of high pressure compressor 12 is calculated in the same manner as the low pressure bleed mass flow rate $WB_{26}$, or the product of inlet mass flow rate $W_{25}$ and a function of the inlet corrected mass flow rate $WR_{25}$ of high pressure compressor 12.

High pressure compressor module 105 also calculates the exit pressure $P_3$ of high pressure compressor 12 and the exit temperature $T_3$ of high pressure compressor 12 in order to be utilized as inputs to a combustor module 110. As seen above, the exit temperature $T_3$ is a function of the exit enthalpy $H_3$. The exit pressure of $P_3$ is equivalent to the sensed inlet pressure $P_{25}$ multiplied by a function of the percent corrected speed % $N_{25}$ and the operating line parameter $GH_{25}$ of high pressure compressor 12 (as determined from a map of high pressure compressor 12). Further, the exit enthalpy $H_3$ of high pressure compressor 12 is input into combustor module 110, as is a combustor mass flow rate $W_{36}$ calculated by engine control 75. The exit enthalpy $H_3$ is calculated as described above, while the combustor mass flow rate $W_{36}$ is calculated as follows:

$$W_{36} = W_3 - WBC_3 - W_{25} \times (0.211)$$

$$W_3 = W_{25} - WB_{26} - WBC_{27} - WB_{28} - WB_3$$

$$WB_3 = W_{25} \times f(WR_{25})$$

where $W_{36}$=combustor mass flowrate
$W_3$=exit mass flowrate of high pressure compressor 12
$W_{25}$=inlet mass flowrate of high pressure compressor 12
$WBC_3$=high pressure customer bleed flowrate of high pressure compressor 12
$WB_3$=high pressure bleed mass flowrate of high pressure compressor 12

As seen above, the combustor mass flow rate $W_{36}$ is equivalent to the exit mass flow rate $W_3$ of high pressure compressor 12, subtracted first by the high pressure customer bleed flow $WBC_3$ and second by the product of the inlet mass flowrate $W_{25}$ of high pressure compressor 12 and 0.211. The exit mass flowrate $W_3$ is in turn equivalent to the inlet mass flow rate $W_{25}$ subtracted by the low pressure bleed flow mass flow rate $WB_{26}$, the mid pressure customer bleed $WBC_{27}$, the mid pressure bleed mass flow rate $WB_{28}$ and the high pressure bleed mass flow rate $WB_3$. The high pressure bleed mass flowrate $WB_3$ is equivalent to the inlet mass flowrate $W_{25}$ of high pressure compressor 12 multiplied by a function of the inlet corrected mass flowrate of high pressure compressor 12 (derived from an applicable map of high pressure compressor 12).

High pressure compressor module 105 also calculates a high pressure turbine cooling flow $WC_{41}$ by multiplying a correction factor (0.1455) and the inlet mass flow rate $W_{25}$. This high pressure turbine cooling flow $WC_{41}$ is then input into a high pressure turbine module 115, which will be described in more detail hereinafter.

Finally, high pressure compressor module 105 calculates the combustor static pressure $PS_{32}$ as engine parameter 102 which is then sent to engine control 75 for comparison with the sensed burner static pressure in conjunction with the logic of system 85. It will be understood that the combustor static pressure $PS_{32}$ is calculated by the following equations:

$$PS_{32} = (0.53)(P_3 - PS_3) + PS_3$$

$$P_3 = P_{25} \times (P_3/P_{25}) = P_{25} \times f(\% N_{25}, GH_{25})$$

$$PS_3 = (0.9516)(P_3) - 1.182$$

where $PS_{32}$=combustor static pressure
$P_3$=exit pressure of high pressure compressor
$PS_3$=exit static pressure of high pressure compressor Of course, it will be understood from FIG. 4 that the calculated value of combustor static pressure $PS_{32}$ will be continually updated in algorithm 100, as indicated by the feedback 102 from high pressure compressor module 105 to engine control 75.

It will be seen that a combustor module 110 receives the fuel heating value FHV, the fuel flow $W_f$, the compressor exit pressure $P_3$, the compressor exit temperature $T_3$, the compressor exit enthalpy $H_3$, and the combustor mass flow rate $W_{36}$ as inputs. Accordingly, combustor module 110 performs the necessary calculations for determining the combustor exit pressure $P_4$, the combustor exit enthalpy $H_4$, and the combustor exit mass flow rate $W_4$. This is accomplished by the following equations:

$$P_4 = P_3 - (1.332 \times 10^{-4})(W_{36})^2 \times (T_3/P_3)$$

$$H_4 = [H_3 + (0.995 \times FHV + 283.6) \times FAR_4]/(1 + FAR_4)$$

$$W_4 = W_{36} \times (1 + FAR_4)$$

$$FAR_4 = W_f/(3600 \times W_{36})$$

where $P_4$=combustor exit pressure
FHV=fuel heating value
$FAR_4$=combustor fuel-to-air ratio
$H_4$=combustor exit enthalpy
$W_4$=combustor exit mass flowrate It will be seen that the combustor exit pressure $P_4$, combustor exit enthalpy $H_4$, and combustor exit mass flow rate $W_4$ are calculated from parameters previously discussed herein.

A high pressure turbine module 115, as seen in FIG. 4, receives as inputs combustor exit pressure $P_4$, combustor exit enthalpy $H_4$, combustor exit mass flow rate $W_4$, compressor exit enthalpy $H_3$, combustor mass flow rate $W_{36}$, high pressure turbine cooling flow $WC_{41}$, fuel flow $W_f$ to the combustor 25, exit pressure $P_{48}$ of the high pressure turbine 13, rotor speed $N_{25}$, and a high pressure turbine loss guess $HLG_{41}$. High pressure turbine module 115 then performs calculations in order to determine the high pressure turbine cycle flow function $WR_{41}$, the high pressure turbine map flow function $WRM_{41}$, the high pressure turbine ideal work $\Delta HIR_{41}$, the high pressure turbine efficiency $ED_{41}$, and the power $PW_4$ of high pressure turbine 13. Each of these parameters is then an output which is provided to a separate error/guess module 120. The equations utilized to calculate these outputs are as follows:

$$WRM_{41} = f(\Delta HIR_{41}, N_{41})$$

$$ED_{41} = f(\Delta HIR_{41}, N_{41})$$

$$PW_4 = W_{41} \times \Delta HIR_{41} \times T_{41}$$

$$WR_{41} = W_{41} \times \sqrt{T_{41}}/P_4$$

where $WRM_{41}$=map flow function of high pressure turbine 13
$ED_{41}$=efficiency of high pressure turbine 13
$PW_4$=power of high pressure turbine 13
$WR_{41}$=cycle flow function of high pressure turbine 13 and $$WA_{41} = W_{36} + WC_{41}$$

$$FAR_{41} = W_f/(3600\ WA_{41})$$

$$W_{41} = WA_{41}(1 + FAR_{41})$$

$$H_{41} = (H_4 \times W_4 + H_3 \times WC_{41})/W_{41}$$

$$T_{41} = f(H_{41}, FAR_{41})$$

$$GAM_{41} = f(T_{41}, FAR_{41})$$

$$N_{41} = N_{25}/\sqrt{T_{41}}$$

$$EXP = (GAM_{41} - 1)/GAM_{41}$$

$$\Delta HIR_{41} = [1 - (P_{48}/P_4)^{EXP}] \times CP_{41}$$

$$\Delta HIR_{41} = \Delta HIR_{41} - HLG_{41}$$

where $WA_{41}$=air mass flowrate of high pressure turbine 13
$FAR_{41}$=fuel/air ratio of high pressure turbine 13
$W_{41}$=mass flowrate of high pressure turbine 13
$H_{41}$=inlet enthalpy of high pressure turbine 13
$T_{41}$=inlet temperature of high pressure turbine 13
$GAM_{41}$=specific heat ratio
$CP_{41}$=specific heat @ constant pressure
$N_{41}$=corrected speed of high pressure turbine 13
EXP=exponent
$\Delta HIR_{41}$=ideal work of high pressure turbine 13

Afterward, it will be seen that the inputs to the error/guess module 120 include the high pressure turbine loss guess $HLG_{41}$, the rotor speed $N_{25}$, the high pressure compressor operating line parameter $GH_{25}$, the high pressure turbine cycle flow function $WR_{41}$, the high pressure turbine map flow function $WRM_{41}$, the high pressure turbine ideal work $\Delta HIR_{41}$, the high pressure turbine efficiency $ED_{41}$, the high pressure turbine power $PW_4$, the high pressure compressor power $PW_{25}$, and a time step $\Delta t$. The purpose of error/guess module 120 is to calculate and update the values for the high pressure turbine loss estimate $HLG_{41}$, the rotor speed $N_{25}$, and the high pressure compressor operating line parameter $GH_{25}$. It will be understood that these parameters are utilized to balance the inputs to algorithm 100 and are defined as follows:

$$HLG_{41(t)} = HLG_{41(t-\Delta t)} - (0.5)(YHL_{41})$$

$$YHL_{41} = HL_{41} - HLG_{41(t-\Delta t)}$$

$$HL_{41} = \Delta HIR_{41} \times (1 - ED_{41})$$

where $HLG_{41(t)}$=new high pressure turbine loss estimate
$HLG_{41(t-\Delta t)}$=old high pressure turbine loss estimate
$YHL_{41}$=high pressure turbine loss error
$HL_{41}$=high pressure turbine loss
$\Delta HIR_{41}$=high pressure turbine ideal work
$ED_{41}$=high pressure turbine efficiency $$N_{25(t)} = N_{25(t-\Delta t)} + (NDOT_{25} \times \Delta t)$$

$$NDOT = 3391.6 \times YPW/N_{25(t-\Delta t)}$$

$$YPW = PW_4 - PW_{25}$$

where
- $N_{25(t)}$=new rotor speed
- $N_{25(t-\Delta t)}$=old rotor speed
- $NDOT_{25}$=shaft acceleration
- YPW=net shaft power unbalance
- $PW_4$=high pressure turbine power
- $PW_{25}$=high pressure compressor power $$GH_{25(t)}=GH_{25(t-\Delta t)}-YWR_{41}$$

$$YWR_{41}=(WRM_{41}-WR_{41})/WRD$$

where
- $GH_{25(t)}$=new high pressure compressor operating line parameter
- $GH_{25(t-\Delta t)}$=old high pressure compressor operating line parameter
- $YWR_{41}$=high pressure turbine flow function error
- $WRM_{41}$=high pressure turbine map flow function
- $WR_{41}$=high pressure turbine flow function
- WRD=high pressure turbine design flow function Therefore, it will be seen that the high pressure turbine loss guess $HLG_{41}$ is equivalent to the previous or old high pressure turbine loss guess subtracted by the high pressure turbine loss error $YHL_{41}$ multiplied by 0.5. The high pressure turbine loss error $YHL_{41}$, in turn, is equivalent to the high pressure turbine loss $HL_{41}$ minus the previous high pressure turbine loss estimate $HLG_{41}$, where the high pressure turbine loss $HL_{41}$ is equal to the difference of 1 minus the high pressure turbine efficiency $ED_{41}$ multiplied by the ideal work $\Delta HIR_{41}$ of high pressure turbine 13.

Next, the new rotor speed $N_{25(t)}$ is equivalent to the previous or old rotor speed $N_{25(t-\Delta t)}$ plus the product of the shaft acceleration $NDOT_{25}$ and time step $\Delta t$. The shaft acceleration $NDOT_{25}$ is equivalent to the net shaft balance power unbalance YPW divided by the old rotor speed $N_{25(t-\Delta t)}$, and then multiplied by 3391.6, where the net shaft power unbalance YPW is equivalent to the high pressure compressor power $PW_{25}$ subtracted from the high pressure turbine power $PW_4$.

The new or updated operating line parameter $GH_{25(t)}$ for high pressure compressor 12 is equivalent to the old operating line parameter $GH_{25(t-\Delta t)}$ minus the high pressure turbine flow function error $YWR_{41}$. The high pressure turbine flow function error $YWR_{41}$ is, in turn, equal to the high pressure turbine map flow function $WRM_{41}$ minus the high pressure cycle flow function $WR_{41}$, with the difference thereof divided by a high pressure turbine design flow function WRD.

It should be noted that the time taken for one pass through algorithm 100 preferably is significantly less than the time step $\Delta t$ utilized therein. This is due to the fact that algorithm 100 is only a part of engine control 75, and therefore it should not compromise the ability of engine control 75 to operate in real time. In this way, system 85 is able to operate nearly in real time with engine 10.

Further, the predetermined amount or threshold which must be reached in order for a partial flame out to be detected will differ with each application of the present invention, but for purposes of the LM6000 DLE engine and the triple annular combustor 25 utilized therein, this predetermined amount preferably will be approximately 10–15% of the calculated value for engine parameter 102 which in the preferred case is the combustor static pressure $PS_{32}$. It should be noted that the engine parameter 102 utilized to represent the sensed and calculated performance of engine 10 is actually the fuel flow $W_f$ divided by the combustor static pressure $PS_{32}$. However, since the fuel flow $W_f$ will be equivalent for both the sensed and calculated values of engine parameter 102, this is a negligible factor.

Having shown and described the preferred embodiment of the present invention, further adaptations of the system and method for detecting partial flame out of a gas turbine engine combustor can be accomplished by appropriate modifications by one of ordinary skill in the art without departing from the scope of the invention.

What is claimed is:

1. A method of detecting partial flame out in a combustor of a gas turbine engine, comprising the following steps:

(a) establishing a model for performance of said engine during a particular operating mode of said combustor, wherein said model assumes that all fuel supplied during said combustor operating mode is burned;

(b) calculating a value for an engine parameter in said model representative of engine performance;

(c) sensing a value for said engine parameter during operation of said engine at said combustor operating mode;

(d) comparing said calculated value of said engine parameter and said sensed value of said engine parameter; and (e) relighting said combustor flame when said sensed value of said engine parameter differs from said calculated value of said engine parameter by a predetermined amount.

2. The method of claim 1, wherein said model is based on an average performance of a gas turbine engine within a specific engine line.

3. The method of claim 1, wherein said model is based on performance of said gas turbine engine.

4. The method of claim 3, further comprising the step of modifying said predetermined amount in accordance with any distinction in performance of said engine with an average performance of a gas turbine engine within the same engine line.

5. The method of claim 1, wherein said engine parameter is the inlet static pressure of said combustor.

6. The method of claim 1, wherein said engine parameter is the rotor speed of a high pressure shaft in said gas turbine engine.

7. The method of claim 1, wherein said engine parameter is calculated independent of an actual rotor speed of said engine.

8. The method of claim 1, wherein said engine parameter is calculated from boundary conditions sensed in the engine, said boundary conditions further comprising compressor inlet pressure, compressor inlet temperature, and turbine exit pressure.

9. The method of claim 8, wherein variable engine parameters are utilized in said model to balance the calculation of said engine parameter for a given set of boundary conditions, said variable engine parameters comprising rotor speed of a high pressure shaft, a high pressure compressor operating line parameter, and an estimate of high pressure turbine loss.

10. The method of claim 1, wherein said predetermined amount is large enough to accommodate engine to engine variation and engine deterioration.

11. The method of claim 1, wherein partial flame out of said combustor is detected substantially in real time.

12. The method of claim 1, said combustor including a plurality of annular domes defining distinct combustion zones, each of said annular domes comprising a plurality of carburetor devices positioned circumferentially therearound, wherein said combustor operating mode involves the activation of carburetor devices in at least a pilot dome.

13. The method of claim 12, wherein said combustor operating mode involves the activation of carburetor devices in at least said pilot dome and one other dome.

14. The method of claim 1, wherein said combustor is designed for low emissions and operates under lean fuel conditions.

15. The method of claim 1, wherein said steps are performed continuously in a closed loop.

16. A method of detecting partial flame out in a combustor of a gas turbine engine, comprising the following steps:

(a) establishing a model for performance of said engine during a particular operating mode of said combustor, wherein said model assumes that all fuel supplied during said combustor operating mode is burned;

(b) calculating a value for an engine parameter in said model representative of engine performance;

(c) sensing a value for said engine parameter during operation of said engine at said combustor operating mode;

(d) comparing said calculated value of said engine parameter and said sensed value of said engine parameter;

(e) establishing a reference value for said engine parameter based on the performance of said engine during said combustor operating mode at total fuel burn;

(f) comparing the difference of said sensed and calculated values of said engine parameter to said reference value of said engine parameter; and (g) relighting said combustor flame when said difference of said sensed and calculated values of said engine parameter differs from said reference value of said engine parameter by a predetermined amount.

* * * * *